United States Patent
Gupta

(10) Patent No.: US 9,953,105 B1
(45) Date of Patent: Apr. 24, 2018

(54) SYSTEM AND METHOD FOR CREATING SUBDOMAINS OR DIRECTORIES FOR A DOMAIN NAME

(71) Applicant: Go Daddy Operating Company, LLC, Scottsdale, AZ (US)

(72) Inventor: Nitin Gupta, Mountain View, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 535 days.

(21) Appl. No.: 14/542,224

(22) Filed: Nov. 14, 2014

Related U.S. Application Data

(63) Continuation-in-part of application No. 14/504,034, filed on Oct. 1, 2014.

(51) Int. Cl.
*G06F 17/30* (2006.01)
*H04L 29/06* (2006.01)

(52) U.S. Cl.
CPC .. *G06F 17/30952* (2013.01); *G06F 17/30979* (2013.01); *H04L 67/42* (2013.01)

(58) Field of Classification Search
None
See application file for complete search history.

(56) References Cited

U.S. PATENT DOCUMENTS

| | | |
|---|---|---|
| 6,332,158 B1 | 12/2001 | Risley et al. |
| 6,334,132 B1 | 12/2001 | Weeks |
| 6,338,082 B1 | 1/2002 | Schneider |
| 6,442,602 B1 * | 8/2002 | Choudhry .............. H04L 29/06 370/252 |
| 6,446,133 B1 | 9/2002 | Tan et al. |
| 6,480,508 B1 | 11/2002 | Mwikalo et al. |
| 6,560,634 B1 | 5/2003 | Broadhurst |

(Continued)

FOREIGN PATENT DOCUMENTS

| | | |
|---|---|---|
| JP | 2001167017 | 6/2001 |
| JP | 2002297938 | 10/2002 |
| WO | 9909726 | 2/1999 |

OTHER PUBLICATIONS

Fusu introduces Domain Stock Exchange in private beta, http://www.domainnamenews.com/domain-sales/ fusuintroduces-domain-stock-exchange-in-private-beta/885, Oct. 17, 2007.

(Continued)

*Primary Examiner* — Son T Hoang
(74) *Attorney, Agent, or Firm* — Quarles and Brady

(57) ABSTRACT

Domain name mappings are created using a system and method. A registration of a first domain name by a user associated with a user account is detected and a Domain Name System (DNS) server is accessed to identify a second domain name selected from a plurality of domain names associated with the user account. Without input from the user, a subdomain for the second domain name is created by modifying a DNS record of the second domain name or a directory at the second domain name is created. The subdomain or the directory correspond to a top-level domain (TLD) of the first domain name. A redirect from the subdomain or the directory of the second domain name is created to the first domain name or from the first domain name to the at least one of the subdomain and the directory of the second domain name.

20 Claims, 7 Drawing Sheets

(56) References Cited

U.S. PATENT DOCUMENTS

| | | |
|---|---|---|
| 6,687,746 B1 | 2/2004 | Shuster et al. |
| 6,745,248 B1 | 6/2004 | Gardos et al. |
| 6,760,746 B1 | 7/2004 | Schneider |
| 6,876,997 B1 | 4/2005 | Rorex et al. |
| 6,880,007 B1 | 4/2005 | Gardos et al. |
| 6,895,430 B1 | 5/2005 | Schneider |
| 6,901,436 B1 | 5/2005 | Schneider |
| 6,973,505 B1 | 12/2005 | Schneider |
| 6,976,090 B2 | 12/2005 | Ben-Shaul et al. |
| 6,980,990 B2 | 12/2005 | Fellman |
| 7,000,028 B1 | 2/2006 | Broadhurst et al. |
| 7,039,697 B2 | 5/2006 | Bayles |
| 7,069,323 B2 | 6/2006 | Gardos et al. |
| 7,076,541 B1 | 7/2006 | Burstein et al. |
| 7,099,956 B2 | 8/2006 | Shuster et al. |
| 7,107,227 B1 | 9/2006 | Bezos et al. |
| 7,136,932 B1 * | 11/2006 | Schneider .......... H04L 29/12594 709/217 |
| 7,143,048 B1 | 11/2006 | Ruben et al. |
| 7,167,904 B1 | 1/2007 | Devarajan et al. |
| 7,188,138 B1 | 3/2007 | Schneider |
| 7,194,552 B1 | 3/2007 | Schneider |
| 7,238,661 B2 | 7/2007 | Glynn et al. |
| 7,287,002 B1 | 10/2007 | Asher et al. |
| 7,289,971 B1 | 10/2007 | O'Neil et al. |
| 7,296,026 B2 | 11/2007 | Patrick et al. |
| 7,299,299 B2 | 11/2007 | Hallenbeck et al. |
| 7,299,491 B2 | 11/2007 | Shelest et al. |
| 7,305,394 B2 | 12/2007 | Fellman |
| 7,319,992 B2 | 1/2008 | Gaos |
| 7,346,899 B2 | 3/2008 | Ebro et al. |
| 7,356,534 B2 | 4/2008 | Mohammed et al. |
| 7,386,438 B1 | 6/2008 | Franz et al. |
| 7,400,981 B1 | 7/2008 | Rigney |
| 7,418,471 B2 | 8/2008 | King et al. |
| 7,472,160 B2 | 12/2008 | King et al. |
| 7,493,403 B2 | 2/2009 | Shull et al. |
| 7,542,969 B1 | 6/2009 | Rappaport et al. |
| 7,599,920 B1 | 10/2009 | Fox et al. |
| 7,606,858 B2 | 10/2009 | King et al. |
| 7,627,628 B2 | 12/2009 | King et al. |
| 7,657,436 B2 | 2/2010 | Elmore et al. |
| 7,664,831 B2 | 2/2010 | Cartmell et al. |
| 7,668,119 B2 | 2/2010 | Thubert et al. |
| 7,680,819 B1 | 3/2010 | Melimer et al. |
| 7,689,458 B2 | 3/2010 | Heckerman et al. |
| 7,698,425 B2 | 4/2010 | Thayer et al. |
| 7,698,426 B2 | 4/2010 | Thayer et al. |
| 7,702,902 B2 | 4/2010 | Thayer et al. |
| 7,711,850 B2 | 5/2010 | Ronen et al. |
| 7,711,851 B2 | 5/2010 | Ronen et al. |
| 7,725,602 B2 | 5/2010 | Liu et al. |
| 7,734,745 B2 | 6/2010 | Gloe |
| 7,761,565 B2 | 7/2010 | Adelman et al. |
| 7,761,566 B2 | 7/2010 | Adelman et al. |
| 7,788,130 B2 | 8/2010 | Feeley et al. |
| 7,805,379 B1 | 9/2010 | Adkins, III et al. |
| 7,805,426 B2 | 9/2010 | Leung et al. |
| 7,822,868 B2 | 10/2010 | Gassewitz et al. |
| 7,877,432 B2 | 1/2011 | Maxson et al. |
| 7,890,369 B2 | 2/2011 | Mooney |
| 7,890,602 B1 | 2/2011 | Parsons et al. |
| 7,917,389 B2 | 3/2011 | Mooney |
| 7,921,035 B2 | 4/2011 | Adelman |
| 7,953,812 B2 | 5/2011 | Ruiz |
| 7,953,813 B2 | 5/2011 | Ruiz |
| 7,962,438 B2 | 6/2011 | Adelman et al. |
| 8,015,006 B2 | 9/2011 | Kennewick et al. |
| 8,024,428 B2 | 9/2011 | Adelman et al. |
| 8,037,168 B2 | 10/2011 | Schneider |
| 8,065,300 B2 | 11/2011 | Gupta et al. |
| 8,069,187 B2 | 11/2011 | Adelman et al. |
| 8,156,180 B2 | 4/2012 | Adelman |
| 8,171,070 B2 | 5/2012 | Zimmerman et al. |
| 8,171,110 B1 | 5/2012 | Parsons et al. |
| 8,195,652 B1 | 6/2012 | Parsons et al. |
| 8,209,379 B2 | 6/2012 | Adelman |
| 8,234,351 B2 | 7/2012 | Curran et al. |
| 8,276,057 B2 | 9/2012 | Rowe et al. |
| 8,280,952 B1 | 10/2012 | Parsons et al. |
| 8,301,743 B2 | 10/2012 | Curran et al. |
| 8,370,217 B1 | 2/2013 | Parsons et al. |
| 8,380,800 B2 | 2/2013 | Ruiz |
| 8,396,969 B1 * | 3/2013 | Schwartz ............ H04L 29/00 707/999.003 |
| 8,489,746 B2 | 7/2013 | Nicks et al. |
| 8,515,969 B2 | 8/2013 | Nicks et al. |
| 8,706,728 B2 | 4/2014 | Nicks et al. |
| 2001/0039543 A1 | 11/2001 | Mann et al. |
| 2002/0010795 A1 | 1/2002 | Brown |
| 2002/0040301 A1 | 4/2002 | Royall, Jr. et al. |
| 2002/0065903 A1 | 5/2002 | Fellman |
| 2002/0091703 A1 | 7/2002 | Bayles |
| 2002/0091827 A1 | 7/2002 | King et al. |
| 2002/0120537 A1 | 8/2002 | Morea et al. |
| 2002/0129013 A1 | 9/2002 | Thomas |
| 2002/0138291 A1 | 9/2002 | Vaidyanathan et al. |
| 2002/0152206 A1 | 10/2002 | Gusler et al. |
| 2002/0173981 A1 | 11/2002 | Stewart |
| 2002/0178383 A1 | 11/2002 | Hrabik et al. |
| 2002/0184172 A1 | 12/2002 | Shlain et al. |
| 2002/0194373 A1 | 12/2002 | Choudhry |
| 2003/0037131 A1 | 2/2003 | Verma |
| 2003/0120649 A1 | 6/2003 | Uchino et al. |
| 2003/0132967 A1 | 7/2003 | Gangadharan |
| 2003/0149690 A1 | 8/2003 | Kudlacik et al. |
| 2003/0177274 A1 | 9/2003 | Sun |
| 2003/0182365 A1 | 9/2003 | Toda et al. |
| 2003/0182573 A1 | 9/2003 | Toneguzzo et al. |
| 2004/0064561 A1 | 4/2004 | Parsons et al. |
| 2004/0068436 A1 | 4/2004 | Boubek et al. |
| 2004/0078490 A1 | 4/2004 | Anderson et al. |
| 2004/0083306 A1 | 4/2004 | Gloe |
| 2004/0093331 A1 | 5/2004 | Garner et al. |
| 2004/0098375 A1 | 5/2004 | DeCarlo, III |
| 2004/0102197 A1 | 5/2004 | Dietz |
| 2004/0133644 A1 | 7/2004 | Warren et al. |
| 2004/0148238 A1 | 7/2004 | Bookstaff et al. |
| 2004/0162742 A1 | 8/2004 | Stoker et al. |
| 2004/0162895 A1 | 8/2004 | Mok et al. |
| 2004/0162916 A1 | 8/2004 | Ryan |
| 2004/0167982 A1 | 8/2004 | Cohen et al. |
| 2004/0172463 A1 | 9/2004 | King et al. |
| 2004/0199493 A1 | 10/2004 | Ruiz et al. |
| 2004/0199520 A1 | 10/2004 | Ruiz et al. |
| 2004/0199608 A1 | 10/2004 | Rechterman |
| 2004/0250109 A1 | 12/2004 | Draughon et al. |
| 2005/0021588 A1 | 1/2005 | Zimmerman et al. |
| 2005/0055299 A1 | 3/2005 | Chambers et al. |
| 2005/0080786 A1 | 4/2005 | Fish et al. |
| 2005/0114484 A1 | 5/2005 | Wilson et al. |
| 2005/0125451 A1 | 6/2005 | Mooney |
| 2005/0144323 A1 | 6/2005 | Gardos et al. |
| 2005/0144520 A1 | 6/2005 | Tuma et al. |
| 2005/0177801 A1 | 8/2005 | Vronay et al. |
| 2005/0198095 A1 | 9/2005 | Du et al. |
| 2005/0203875 A1 | 9/2005 | Mohammed et al. |
| 2005/0203891 A1 | 9/2005 | Broadhurst et al. |
| 2005/0216288 A1 | 9/2005 | Parsons et al. |
| 2005/0216290 A1 | 9/2005 | Sachs et al. |
| 2005/0234363 A1 | 10/2005 | Xue |
| 2005/0234921 A1 | 10/2005 | King et al. |
| 2005/0256853 A1 | 11/2005 | Fellman |
| 2005/0265326 A1 | 12/2005 | Laliberte |
| 2005/0268237 A1 | 12/2005 | Crane et al. |
| 2005/0273344 A1 | 12/2005 | Lee et al. |
| 2005/0289242 A1 | 12/2005 | Ruiz |
| 2006/0004784 A1 | 1/2006 | Ableman |
| 2006/0031330 A1 | 2/2006 | Ruiz |
| 2006/0036767 A1 * | 2/2006 | Ryan ............ H04L 29/12009 709/245 |
| 2006/0059136 A1 | 3/2006 | Woolbridge et al. |
| 2006/0068755 A1 | 3/2006 | Shraim et al. |
| 2006/0101113 A1 | 5/2006 | Lemson et al. |

(56) References Cited

U.S. PATENT DOCUMENTS

| | | |
|---|---|---|
| 2006/0101155 A1 | 5/2006 | Damour et al. |
| 2006/0106793 A1 | 5/2006 | Liang |
| 2006/0112176 A1 | 5/2006 | Lui et al. |
| 2006/0122889 A1 | 6/2006 | Burdick et al. |
| 2006/0136908 A1 | 6/2006 | Gebhart et al. |
| 2006/0155656 A1 | 7/2006 | Kreder, III et al. |
| 2006/0157560 A1 | 7/2006 | Skor et al. |
| 2006/0161681 A1 | 7/2006 | King et al. |
| 2006/0161682 A1 | 7/2006 | King et al. |
| 2006/0168020 A1 | 7/2006 | Brennan, III |
| 2006/0171523 A1 | 8/2006 | Greenwell |
| 2006/0184620 A1 | 8/2006 | Melet et al. |
| 2006/0212931 A1 | 9/2006 | Shull et al. |
| 2006/0218303 A1 | 9/2006 | Adelman et al. |
| 2006/0230380 A1 | 10/2006 | Holmes et al. |
| 2006/0271668 A1 | 11/2006 | Parsons et al. |
| 2006/0287936 A1 | 12/2006 | Jacobson |
| 2007/0061336 A1 | 3/2007 | Ramer et al. |
| 2007/0067465 A1 | 3/2007 | Blinn et al. |
| 2007/0083423 A1 | 4/2007 | Delbridge |
| 2007/0094365 A1 | 4/2007 | Nussey et al. |
| 2007/0112950 A1 | 5/2007 | Parsons et al. |
| 2007/0174255 A1 | 7/2007 | Sravanapudi et al. |
| 2007/0174630 A1 | 7/2007 | Shannon et al. |
| 2007/0180056 A1 | 8/2007 | Assad |
| 2007/0198495 A1 | 8/2007 | Buron et al. |
| 2007/0208740 A1 | 9/2007 | Nye |
| 2007/0208869 A1 | 9/2007 | Adelman et al. |
| 2007/0214284 A1 | 9/2007 | King et al. |
| 2007/0266141 A1 | 11/2007 | Norton |
| 2007/0271393 A1 | 11/2007 | Wong |
| 2007/0287473 A1 | 12/2007 | Dupray |
| 2007/0294431 A1 | 12/2007 | Adelman et al. |
| 2007/0299682 A1 | 12/2007 | Roth et al. |
| 2007/0299815 A1 | 12/2007 | Starbuck et al. |
| 2008/0005127 A1 | 1/2008 | Schneider |
| 2008/0005312 A1 | 1/2008 | Boss et al. |
| 2008/0010365 A1 | 1/2008 | Schneider |
| 2008/0016142 A1 | 1/2008 | Schneider |
| 2008/0016233 A1* | 1/2008 | Schneider ......... G06F 17/30887 709/230 |
| 2008/0034211 A1 | 2/2008 | Shull et al. |
| 2008/0040329 A1 | 2/2008 | Cussen et al. |
| 2008/0065974 A1 | 3/2008 | Campbell |
| 2008/0071909 A1 | 3/2008 | Young et al. |
| 2008/0133580 A1 | 6/2008 | Wanless et al. |
| 2008/0198162 A1 | 8/2008 | Ni |
| 2008/0201258 A1 | 8/2008 | D'Ambrosio |
| 2008/0201487 A1 | 8/2008 | Blinn et al. |
| 2008/0222125 A1 | 9/2008 | Chowdhury |
| 2008/0235383 A1 | 9/2008 | Schneider |
| 2008/0270418 A1 | 10/2008 | Chen et al. |
| 2008/0270486 A1 | 10/2008 | Hind et al. |
| 2008/0313229 A1 | 12/2008 | Taswell |
| 2009/0006351 A1 | 1/2009 | Stephenson et al. |
| 2009/0094137 A1 | 4/2009 | Toppenberg et al. |
| 2009/0119198 A1 | 5/2009 | Manriquez et al. |
| 2009/0125308 A1 | 5/2009 | Ambler |
| 2009/0133580 A1 | 5/2009 | Geurtz |
| 2009/0171678 A1 | 7/2009 | Zimmerman et al. |
| 2009/0171823 A1 | 7/2009 | Zimmerman et al. |
| 2009/0177549 A1 | 7/2009 | Ruiz |
| 2009/0182884 A1 | 7/2009 | Datta et al. |
| 2009/0210417 A1 | 8/2009 | Bennett |
| 2009/0216577 A1 | 8/2009 | Killebrew |
| 2009/0222368 A1 | 9/2009 | McCauley et al. |
| 2009/0241066 A1 | 9/2009 | Costello |
| 2009/0248625 A1 | 10/2009 | Adelman et al. |
| 2009/0248734 A1 | 10/2009 | Adelman et al. |
| 2009/0248735 A1 | 10/2009 | Adelman et al. |
| 2009/0248736 A1 | 10/2009 | Adelman et al. |
| 2009/0249484 A1* | 10/2009 | Howard ............ G06F 21/567 726/24 |
| 2009/0254545 A1 | 10/2009 | Fisken |
| 2009/0254572 A1 | 10/2009 | Redlich et al. |
| 2009/0265415 A1 | 10/2009 | Harry |
| 2009/0292696 A1 | 11/2009 | Shuster |
| 2009/0307256 A1 | 12/2009 | Tiyyagura |
| 2010/0030680 A1 | 2/2010 | Malackowski et al. |
| 2010/0037314 A1 | 2/2010 | Perdisci et al. |
| 2010/0042688 A1 | 2/2010 | Maghraby |
| 2010/0057484 A1 | 3/2010 | Adelman |
| 2010/0058209 A1 | 3/2010 | Adelman |
| 2010/0058210 A1 | 3/2010 | Johnson |
| 2010/0070448 A1 | 3/2010 | Omoigui |
| 2010/0083350 A1 | 4/2010 | Cornelius |
| 2010/0114879 A1 | 5/2010 | Zhong et al. |
| 2010/0115043 A1 | 5/2010 | King et al. |
| 2010/0145678 A1 | 6/2010 | Csomai et al. |
| 2010/0146001 A1 | 6/2010 | Lee |
| 2010/0146119 A1 | 6/2010 | Lee |
| 2010/0169492 A1 | 7/2010 | Lee |
| 2010/0223113 A1 | 9/2010 | Lee |
| 2010/0223132 A1 | 9/2010 | Lee |
| 2010/0223143 A1 | 9/2010 | Lee |
| 2010/0223144 A1 | 9/2010 | Lee |
| 2010/0223278 A1 | 9/2010 | Lee |
| 2010/0228759 A1 | 9/2010 | Thomas |
| 2010/0250353 A1 | 9/2010 | Zimmerman et al. |
| 2010/0274668 A1 | 10/2010 | Langston et al. |
| 2010/0287254 A1 | 11/2010 | Ruiz |
| 2010/0287484 A1 | 11/2010 | Ruiz |
| 2011/0016022 A1 | 1/2011 | Essawi et al. |
| 2011/0055248 A1 | 3/2011 | Consuegra et al. |
| 2011/0087769 A1 | 4/2011 | Holmes et al. |
| 2011/0125830 A1 | 5/2011 | Adelman |
| 2011/0125831 A1 | 5/2011 | Adelman |
| 2011/0208513 A1 | 8/2011 | Nicks et al. |
| 2011/0208723 A1 | 8/2011 | Nicks et al. |
| 2011/0208731 A1 | 8/2011 | Nicks |
| 2011/0208767 A1 | 8/2011 | Nicks |
| 2011/0282988 A1 | 11/2011 | Wang et al. |
| 2012/0072407 A1 | 3/2012 | Shyamsunder et al. |
| 2012/0084281 A1 | 4/2012 | Colosi |
| 2012/0096019 A1 | 4/2012 | Manickam et al. |
| 2012/0271877 A1 | 10/2012 | Nick et al. |
| 2012/0271878 A1 | 10/2012 | Nicks et al. |
| 2012/0272172 A1 | 10/2012 | Nicks et al. |
| 2013/0173497 A1 | 7/2013 | Gould et al. |
| 2013/0254179 A1 | 9/2013 | Tan |
| 2013/0318177 A1 | 11/2013 | Tan |
| 2014/0032589 A1 | 1/2014 | Styler et al. |
| 2014/0067428 A1 | 3/2014 | Snyder et al. |
| 2014/0082064 A1 | 3/2014 | Nicks et al. |
| 2014/0123314 A1 | 5/2014 | Hills et al. |
| 2014/0188871 A1 | 7/2014 | Bushlack et al. |
| 2015/0019958 A1 | 1/2015 | Ying et al. |
| 2015/0081440 A1* | 3/2015 | Blemaster ......... G06Q 30/0256 705/14.54 |
| 2015/0249640 A1 | 9/2015 | Yacoub |
| 2015/0269646 A1 | 9/2015 | Borges et al. |

OTHER PUBLICATIONS

Dnxpert, Fusu Domain Stock Exchange in Beta, http://www.dnxpert.com/2007/10/18/fusu-domain-stock-exchange-in-beta/.
Moffat, RSS—A Primer for Publihsers & Content Proivders, pg. 3, Aug. 20, 2003.
Ramaswamy Chandramouli and Scott Rose "Challenges in Securing the Domain Name System", IEEE Security & Privacy, 2006, pp. 84-87.
Board of Patent Appeals and Interferences, Decision on Appeal for U.S. Appl. No. 10/407,778 decided Sep. 25, 2008.
Business Editorsl High Tech Writers "Network Solutions' Affiliate Program to Offer Expanded Internet Identity Services Through Storefront", Business Wire, May 11, 2000, p. 1.
Register.com to Issue Baltimore Digital Certificates Making e-Security Accessible to All e-Businesses, Nov. 20 2008, Register.com, p. 1.
Go Daddy, Oct. 14, 2007, pp. 1-371, http://web.archive.org/20071011054029/http://help.godaddy.com/article.php?article_id=1122.

(56) References Cited

OTHER PUBLICATIONS

You Can Use Gmail for Your Domain, Mar. 2009, Christian Computing Magazine.
"Domain name Hijacking: Incidents, Threats, Risks, and Remedial Actions", A Report from the ICANN Security and Stability Advisory Committee, pp. 1-48, Jul. 2005.
Van Couvering, DomainsBot Investigation#2, Jan. 22, 2006, pp. 1-6.
EstiBot.com User's Guide, Feb. 4, 2010, pp. 1-22.
Nameboy Ultimate Domain Name Generator, search, creation, domain name lookup and domain registration, Oct. 22, 2008 pp. 1-2.
Ohman, Watch Me Hand Register Keyword.com Domains Worth More than $100, Feb. 21, 2009, pp. 1-5.
Information retrieval—Wikipedia, the free encyclopedia, Nov. 10, 2009, pp. 1-8.
Laidlaw, What's Your Web Site Worth, May 7, 2008, pp. 1-22.
InterNIC, "InterNIC FAQs on the Domain Names, Registrars, and Registration." Sep. 25, 2003. http://www.internic.netlindex.html.
A Major Domain to be Sold at Auction on Oct. 30th—WebChat. com—Offers Premium Web Presence and Growth Opportunity in the Booming Online and Mobile Communications Industry. Anonymous. Oct. 10, 2008.
Staking a claim in cyberspace: [ONT Edition], Rider, David. Toronto Star [Toronto, Ont] Aug. 18, 2007: L 12. Downloaded from ProQuestDirect on the Internet on Mar. 11, 2013, 2 pages.
GoDaddy.com(R) Scores Stunning Super Bowl XL(R) Victory. PR Newswire [New York] Feb. 7, 2006: Downloaded from ProQuestDirect on the Internet on Mar. 11, 2013, 2 pages.
Sedo to host "Around the world in seven days" online Auction, PR Newswire, Europe Including UK, Feb. 11, 2008, downloaded from ProQuestDirect on the Internet on Mar. 11, 2013, 2 pages.
Frontline (http://www.pbs.org/wgbh/pages/frontline/shows/dotcon/thinking/primer.html).
FR E ES E RVE RS (http://www.freeservers.comlWebHosting101/HowDo IChooseADomain Name Registrar. htm l) Nov. 30, 2007.
Xiaobai Cai, Xiaozhong Fan. Class-Based Smoothing to Estimate the Probability of Domain Terms. pp. 344-348. Year 2007.
GHG Internet Services, "Domain Name Registration Information", pp. 1 and 2, Jan. 2002.
Mockapetris, RFC 1035, Domain Names—Implementation and Specification, Nov. 1, 1987.
"Domain Name Search." Jan. 31, 2001. www.domainsearch.com.
DomainNICnames home page, Jul. 23, 2002.
GoDaddy.com screen shot, http://web.archive.org/web/20030401091726/www.godaddy.com/gdshop/default.asp?e=com, Apr. 1, 2003.
Google SafeSearch Filtering (http://web.archive.org/web/20030702191745/http://www.google.com/intl/en/help/customize.html), Jul. 2003, Wayback Machine.
Internet Practice Solutions—Domain Registration Services [Online]. Apr. 4, 2001.
Latitude/Longitude Finder, MapQuest Developer Network, as seen on Jan. 25, 2011 on Archive.org, Source: https://web.archive.org/web/20110125132733/http://developer.mapquest.com/web/tools/.
Lowensohn, Domain Pigeon now finds open Twitter Names, Apr. 9, 2009.
MapQuest Online Mapping Software as seen on Apr. 16, 2009.
Margaret Rouse (Crawler, TechTarget: SearchSOA, Apr. 5, 2005). http://searchsoa.techtarget.com/definition/crawler.
Matt Mazur, CNET!—Let's see what happens (Domain Pigeon), Apr. 9, 2009.
"Namechk Finds Where Your Username Is Taken or Available", Apr. 2, 2009; Lifehacker; http://lifehacker.com/5195578/namechk-finds-where-your-username-is-taken-or-available.
Reitnauer, Timo; "10 Tools for Finding, Registering and Managing Domain Names"; Smashing Magazine, Aug. 29, 2009; www.smashingmagazine.com/2009/08/10-tools.
The Domain Name Exchange, http://www.web.archive.org/web/19991127181836/http://afternic.com, Nov. 27, 1999.
The Domain Name Exchange, http://www.web.archive.org/web/20001019034237/http://afternic.com, Oct. 19, 2000.
Van Grove, Jennifer; "Is Your Username Taken on Social Sites? Find Out With Namechk"; Apr. 2, 2009; Mashable; http://mashable.com/2009/04/02/namechk/.
www.GoDaddy.com screen shot, Dec. 6, 2002.
Kiaobai Cai; Xiaozhong Fan; Class-Based Smoothing to Estimate the Probability of Domain Terms, Complex Medical Engineering, 2007. CME 2007. IEEE/ICME International Conference on Digital Object Identifier: 10.1109/ ICCME.2007.4381753 Publication Year: 2007, pp. 344-348.

* cited by examiner

SYSTEM AND METHOD FOR CREATING SUBDOMAINS OR DIRECTORIES FOR A DOMAIN NAME

CROSS-REFERENCE TO RELATED APPLICATION

This application is a continuation-in-part of and claims priority to U.S. patent application Ser. No. 14/504,034, filed Oct. 1, 2014, and entitled "SYSTEM AND METHOD FOR MANAGING DOMAIN NAME PROJECTS."

FIELD OF THE INVENTION

The present invention generally relates to domain names, and, more specifically, to methods for sorting a plurality of domain names.

BACKGROUND OF THE INVENTION

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other. With this increased popularity and value comes an increased desire for websites and web service providers to procure multiple domain names that may be related to their website, web service, brand, or product. Further, as domain names have become more valuable, many domain name speculators and brokers have amassed vast numbers of domain names. As individuals and entities procure more and more domain names, it can become increasingly difficult for the individual or entity to manage or otherwise keep track of the plurality of domain names that they own or have an interest in. Additionally, these users or entities may have little time to organize a portfolio of domain names.

DETAILED DESCRIPTION OF THE PREFERRED EMBODIMENT

The present invention overcomes the aforementioned drawbacks by providing methods and systems for creating subdomains or directories for domain names amongst a plurality of domain names, wherein the subdomains or directories are related to top-level domains (TLD) of other domain names within the plurality of domain names. By implementing the disclosed methods, users are able to easily capture traffic from incorrect Uniform Resource Locator (URL) or web addresses incorrectly or mistakenly entered by an Internet end user. Although useful with any number of domain names, the disclosed methods become particularly more useful when the number of domain names and/or number of projects increases. Further, in some embodiments, creation of subdomains or directories can occur automatically thereby reducing or eliminating the amount of time a user must spend to organize a portfolio of domain names, including, for example, manual creation of the subdomains or directories.

In one implementation, the present disclosure describes a method including a computing device creating a subdomain or directory for a first domain name of a plurality of domain names associated with a user account. The created subdomain or directory corresponds to a TLD of a second domain name of the plurality of domain names.

In another embodiment, the present disclosure describes a server device that is configured to create a subdomain or directory for a first domain name of a plurality of domain names associated with a user account. The created subdomain or directory corresponds to a TLD of a second domain name of the plurality of domain names.

Figure 1:
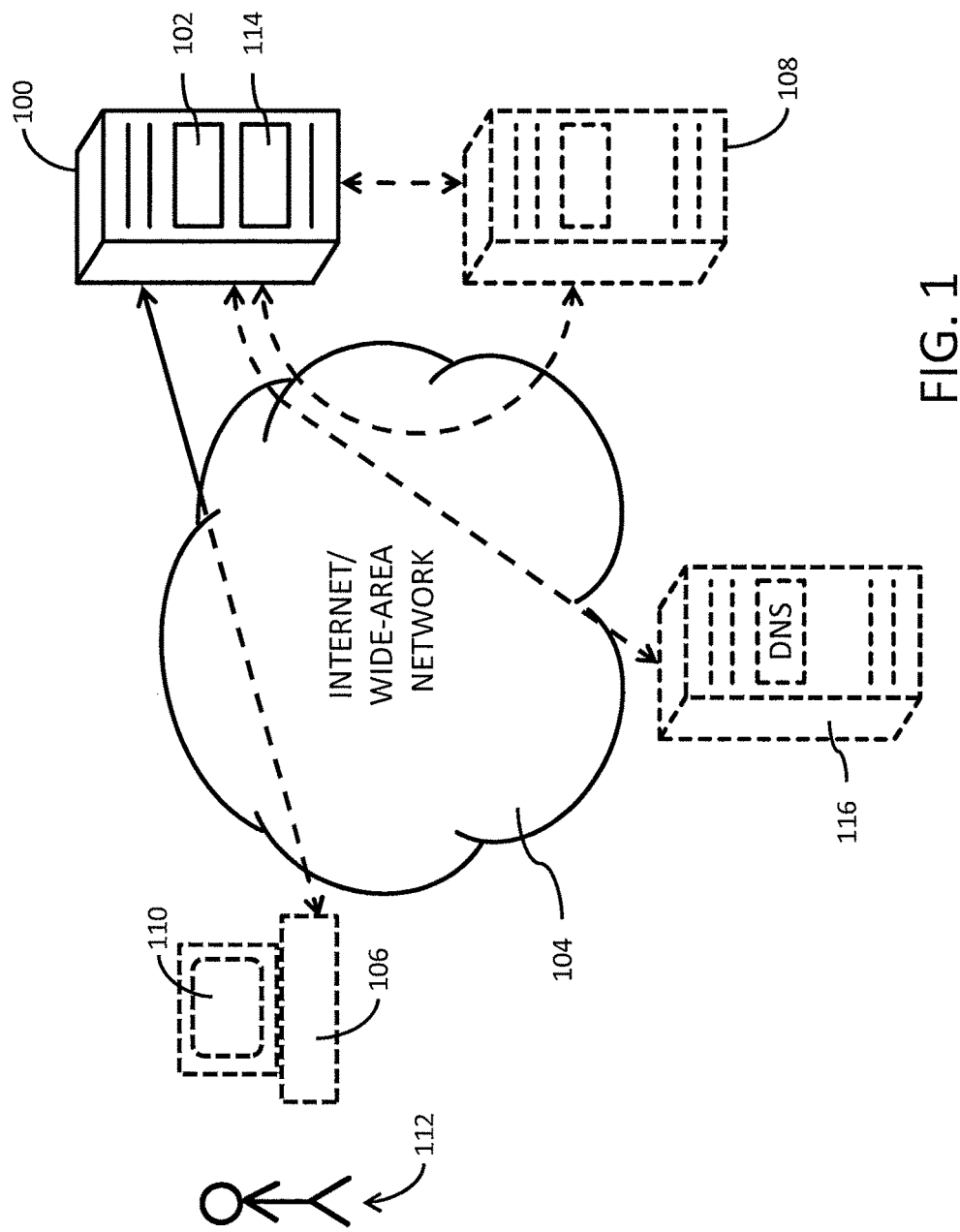
FIG. 1 is a schematic diagram of a server and associated contextual operating environment in accordance with various embodiments of the present disclosure.

Referring first to FIG. 1, an example contextual environment for implementation of the disclosed methods is illustrated. A server 100 (e.g., a server device, a network server, a web server, a computer server, computing device, or the like) may include one or more processing devices 102 (such as one or more central processors) and may include or be communicatively coupled to a network interface. The network interface may in turn be communicatively coupled to a wide-area network such as the Internet 104 thereby coupling the server 100 to the World Wide Web. The server 100 may be one of many servers, for example, as part of a server farm configured to service a large number of client devices 106. A plurality of servers may be communicatively coupled together through a network with other control computers configured to control aspects of the servers and to route communications to and from the servers. In certain embodiments, the server 100 may be communicatively coupled to one or more second servers 108. The second server 108 may in certain embodiments operate together with the first server 100 to provide a web service (e.g., a web resource, website, webpage, or the like). In certain embodiments, the first server 100 and the second server 108 (or any other servers) may be owned, operated, and/or managed by a single entity. Additionally, although the servers 100, 108 are depicted and described as separate hardware entities, in certain embodiments the servers may be the same single server implementing multiple web services. In other embodiments, the first server 100 and the second server 108 (or any other servers) may be owned, operated, and/or managed by separate entities. These separate entities may co-operate through various agreements to provide the web resources (for example, a fee may be provided to access and use the second web resource).

In one embodiment, the server 100 is configured to communicatively couple to a client device 106 through the network interface and the Internet 104 to provide a user interface (such as a graphical user interface or GUI) to search for, procure, buy, sell, register, research, and/or manage one or more domain names. Communications between the server 100 and the client device 106 may be achieved using any electronic communication medium, communication protocol, and computer software suitable for transmission of data over the Internet 104. Examples include, respectively and without limitation: a wired connection, WiFi or other wireless network, cellular network, or satellite network; Transmission Control Protocol and Internet Protocol ("TCP/IP"), Global System for mobile Communications ("GSM") protocols, code division multiple access ("CDMA") protocols, and Long Term Evolution ("LTE") mobile phone protocols; web browsers such as MICROSOFT INTERNET EXPLORER, MOZILLA FIREFOX, and APPLE SAFARI; and other client-executable software modules.

The client device 106 may comprise various computing devices such as, for example, a desktop computer, a laptop computer, a tablet, a smart phone, other network servers, or any other electronic device capable of communicating with the server 100 over the Internet 104. Such a client device 106 may include one or more processing devices, display devices 110, user interfaces, and/or network interfaces. Typically, though not always, the client device 106 is utilized by a user 112 to access the server 100 or a service provided by the server 100. In various embodiments, a user 112 utilizes the client device 106 to access a domain name management user account provided by the server 100 via the Internet 104. The user 112 may be an individual, a group of individuals, a business or other organization, or any other entity that desires to search for, procure, buy, sell, register, research, and/or manage domain names, whether the intent is commercial or non-commercial in nature.

The server 100 may include or be configured to communicate electronically with one or more data stores 114 in order to retrieve information from or store information to the data store 114. In some embodiments, a data store 114 may be a component of the server 100, such as, for example, a memory device of the server 100, or communicatively coupled to the server 100 (such as a memory module or a disk drive). In other embodiments, a data store 114 may be part of a different server (e.g., the second server 108), or as part of a different network-accessible data store. Electronic communication with the data store 114 may be achieved over the Internet 104 using any suitable electronic communication medium, communication protocol, and computer software including, without limitation: a wired connection, WiFi or other wireless network, cellular network, or satellite network; TCP/IP or another open or encrypted protocol; browser software, application programming interfaces, middleware, or dedicated software programs. Electronic communication with the data store 114 may be achieved over another type of network, such as an intranet or virtual private network, or may be via direct wired communication interfaces or any other suitable interface for transmitting data electronically from a data store 114 to the server 100. A data store 114 may include a repository of information that is or can be made freely or securely accessible by the server 100.

In one embodiment, the data store 114 is configured to store information pertaining to a particular user account or a plurality of user accounts for an online domain name management service. Such information may include, for example, demographic information (e.g., name, contact information), payment information, account preferences and settings, and one or more records of a plurality or domain names which are currently owned by and/or managed by a user of the user account or, in some embodiments, are included as part of a wish list or watch list. Additionally, the data store 114 may include information required to provide a user interface to allow a user 112 or a client device 106 to interact with the domain name management service. Such information may include information to provide a website or web page allowing a user 112 of a user account to interact therewith to manage a plurality of domain names. Other suitable information stored within the data store 114 may include, without limitation: databases or database systems, which may be a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future; file systems; and electronic files such as web pages, spreadsheets, and documents. Such data stores 114 may also include, without limitation to the illustrated examples: search engine databases; website information databases, such as domain registries; hosting service provider databases; website customer databases, and internet aggregation databases such as archive.org; government records databases, such as business entity registries maintained by a Secretary of State or corporation commission; public data aggregators, such as FACTUAL, ZABASEARCH, genealogical databases, and the like; social networking data stores, such as public, semi-private, or private information from FACEBOOK, TWITTER, FOURSQUARE, LINKEDIN, and the like; business listing data stores, such as YELP!, Yellow Pages, GOOGLE PLACES, LOCU, and the like; media-specific data stores, such as art museum databases, library databases, and the like; point-of-sale transaction data stores; and offline crawling data stores.

In certain embodiments, the web server 100 is also communicatively coupled a Domain Name System (DNS) server 116 through the Internet 104 or locally through a LAN.

The Internet 104 comprises a vast number of computers (e.g., client devices 106) and computer networks that are interconnected through communication links. The interconnected computers exchange information using various services. In particular, a request for a web page or website may be made to the server 100 or another server by visiting the website's address, known as a Uniform Resource Locator ("URL"). Upon receipt, the requesting device can display the web pages. The request and display of the websites are typically conducted using a browser being an application program that effects the requesting and displaying of web pages.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A URL is much easier to remember and may be used to point to any computer, directory, or file on the Internet. A browser is able to access a website on the Internet 104 through the use of a URL. The URL may include a Hypertext Transfer Protocol (HTTP) request combined with the website's Internet address, also known as the website's domain name. An example of a URL with a HTTP request and domain name is: http://www.example.com. In this hypothetical URL, as used throughout, the "http" identifies the URL as a HTTP request and the "example.com" is the domain name. A domain can host multiple websites that can be accessed by appending character strings that constitute the full path to the website's files. For example, the domain for FACE-BOOK includes one or more websites, as the term is used herein, for each of its users. A user-specific website is requested by appending a directory to the FACEBOOK main URL, e.g.: http://www.facebook.com/username.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar (e.g., GODADDY) is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows a user 112 to use an ICANN-accredited registrar, such as GODADDY, to register their domain name. For example, if the user 112 wishes to register the domain name "example.com," the user 112 may initially determine whether the desired domain name is available by contacting the domain name registrar. The user 112 may make this contact using the registrar's web page and typing the desired domain name into a field on the registrar's web page created for this purpose. Upon receiving the request from the user 112, the registrar may ascertain whether "example.com" has already been registered by checking the SRS database associated with the TLD of the domain name (e.g., ".com"). The results of the search then may be displayed on the web page to thereby notify the user 112 of the availability of the domain name. If the domain name is available, the user 112 may proceed with the registration process. Otherwise, the user 112 may keep selecting alternative domain names until an available domain name is found. Domain names are typically registered for a period of one to ten years with first rights to continually re-register the domain name.

A user 112 (e.g., individual or entity) may amass a portfolio of domain names that they own or are otherwise responsible for. This portfolio may be associated with, for example, a user account for a domain name management service offered by the server 100. The domain name management service may be provided by a domain name registrar (e.g., GODADDY) as a free or paid service. A user 112 may be required to log on to the particular user account upon accessing the domain name management web service through the Internet 104. In certain embodiments, some or all domain names in the portfolio may be owned by, licensed by, or managed by the user 112 of the user account. The plurality of domain names within the portfolio may have been procured by the user (e.g., through a purchase or transfer) through the domain name management service, or through another available service. The plurality of domain names may be managed by the domain name management service (e.g., by performing status updates and data updates for the domain names). Other domain name management features not explicitly disclosed herein but understood in the art are contemplated by this disclosure, as well. Some or all of the plurality of domain names in the portfolio may be purchased or managed at other online domain services, but are associated nonetheless with the user 112 of the user account through ownership or other property interest (e.g., contract, license, etc.). This ownership or interest may be determined through investigation by the server 100 performing domain lookup procedures (e.g., a WHOIS query), the server 100 contacting the other online domain name service, or by a user 112 indicating ownership or property interest in the domain name. In certain embodiments, the portfolio of domain names may include one or more domain names that the user 112 does not presently have an ownership or property interest in, but that the user 112 may be watching or is otherwise interested in procuring. Further, the embodiments described herein are not exclusively limited to pure domain names (e.g., example.com), but may in certain embodiments included subdomains (e.g., blog.example.com) and directories (example.com/blog).

As the number of domain names associated with the user account grows, the task of managing the plurality of domain names can become increasingly cumbersome. For example, some user accounts may include thousands of domain names associated with the user account. In a commercial or retail setting, a user 112 (e.g., a company) may own or have property interest in thousands of domain names that are related to the name of their company and/or products or services. In an example used throughout this disclosure, a company having the name "Example" may wish to protect their brand ("Example") and prevent brand domain name confusion. In doing so, the company may procure "example.com" as well as every domain name including "example" in every top-level domain (e.g., example.net, example.biz, example.info, etc.). In another example, the user company may wish to procure multiple domain names covering common or uncommon variations of the brand or product name, possibly in every TLD permutation available (e.g., exampleco.com, exampleco.net, examples.info, exampleinc.ca, example-inc.com, examplecompany.co.uk, etc.). Additionally, the company may wish to procure multiple domain names covering common or uncommon misspellings of the brand or product name, possibly in every TLD permutation available (e.g., exammple.com, exammple.net, exemple.com, exemple.info, exmpl.biz, etc.). If the user company "Example" makes a product called "The Widget", the user company may wish to procure domain names related to the product, possibly in every TLD permutation available (e.g., widget.com, widget.info, example-widget.net, widgetbyexample.ca etc.). There are many different variations of domain names and domain name procurement strategies that a user 112 may pursue in brand name and product name protection. What is readily apparent is that the number of domain names associated with a user 112 or a user account can quickly become astronomical and unwieldy, particularly when multiple TLD permutations are pursued.

Additionally, and in a different approach, the user 112 may be a domain speculator, domain broker, or domainer, whose primary interest is in buying and selling domain names. For example, a domain speculator user may procure hundreds or thousands of domain names related to the company "Example" discussed above, which they may in turn package together and attempt to sell or license to the company or other domain brokers. However, the domain speculator user may also procure hundreds or thousands of domain names related to an entirely separate entity. What is readily apparent is that the number of domain names within a domain speculator user account may also quickly become astronomical and unwieldy.

Figure 2:
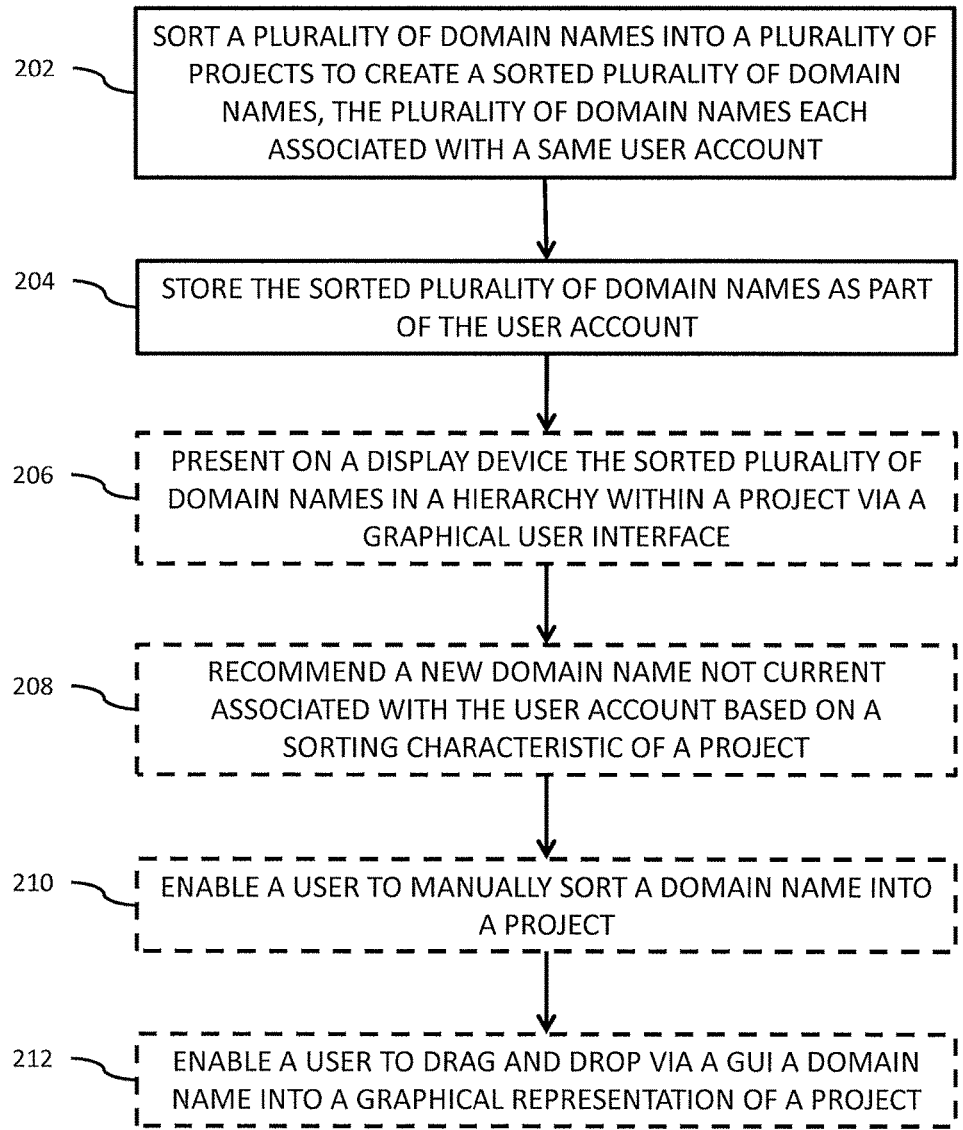
FIG. 2 is a functional schematic diagram of a method in accordance with the various embodiments of the present disclosure.

Turning now to FIG. 2, an example flow diagram of a method 200 is illustrated in accordance with various embodiments. In certain embodiments, the method 200 aids in the organization of a plurality of domain names within or associated with a user account. Further, a computing device, such as the server 100 or the client device 106, may be configured to execute all or parts of the method 200 and other methods described herein. The method 200 includes at step 202, sorting by a computing device a plurality of domain names into a plurality of projects to create a sorted plurality of domain names.

Figure 3:
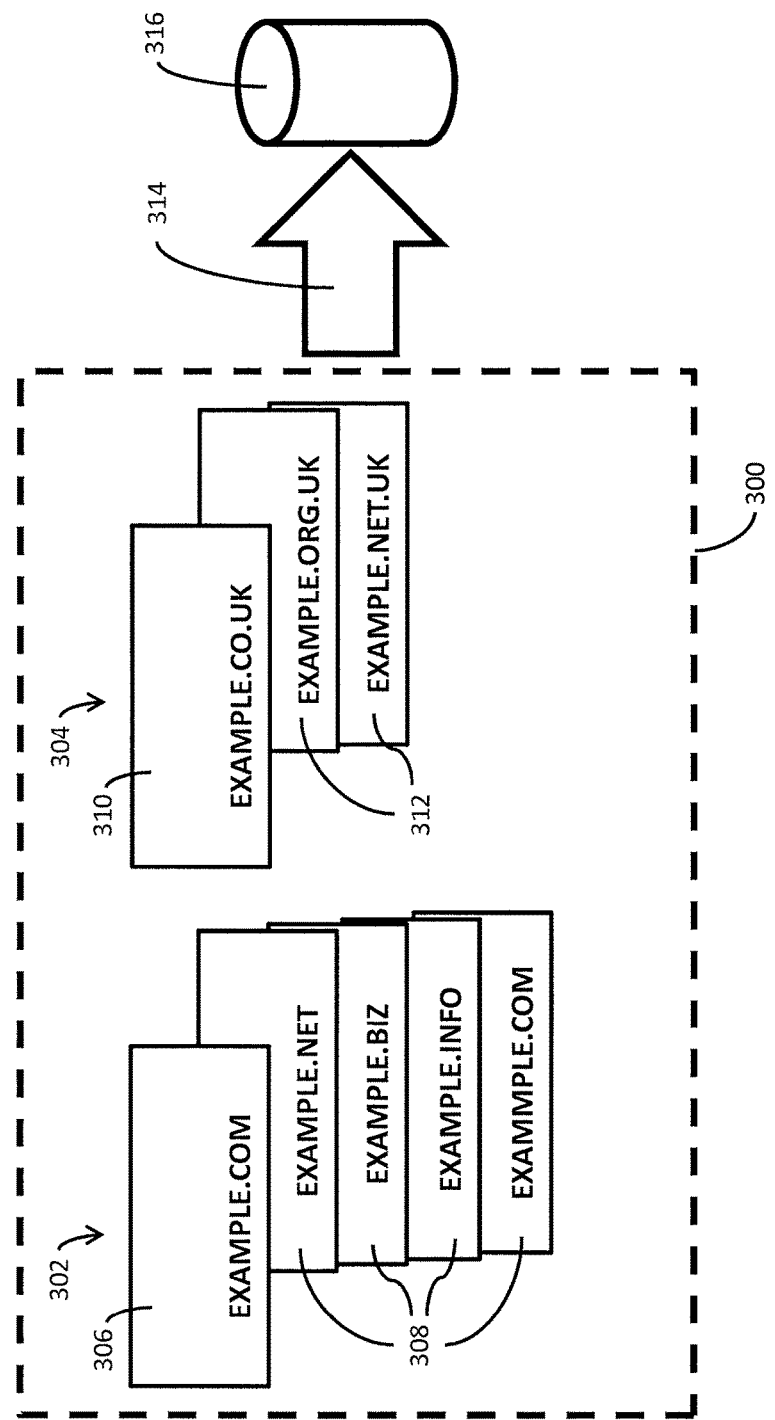
FIGS. 3 and 4 are example visual depictions of the method in accordance with the various embodiments of the present disclosure.

Sorting of the plurality of domain names into a plurality of projects is illustrated in FIG. 3, which is a visual depiction of the method in accordance with various embodiments. Moreover, in at least one approach, the depiction of FIG. 3 may represent one example of at least a portion of a graphic user interface (GUI) configured to enable a user 112 to view, edit, or otherwise modify a sorted plurality of domain names. An example of a sorted plurality of domain names 300 is shown. The plurality of domain names 300 have been sorted per step 202 of FIG. 2 into at least two projects, a first project 302 and a second project 304. In at least one embodiment, the sorted plurality of domain names 300 are associated with the user account. The groupings are called "projects" as they may pertain to one or more domain-name-related projects, tasks, or goals. For instance, as is shown in the example of FIG. 3, the first project 302 may pertain to a project or goal of obtaining as many domain names as possible similar to "example.com" in all TLDs. Therefore, the first project 302 may have a sorting characteristic aimed at that goal. Similarly, the example second project 304 may pertain to a project or goal of obtaining as many related domain names as possible within the United Kingdom (with the TLD ".uk"). Therefore, the second project 304 may have a sorting characteristic aimed at that goal. As is readily understood, these are but two example projects with two example sorting characteristics, and one of skill in the art will understand that many other sorting characteristics (including, for example, schemes, categories, attributes, or other aspects of domain names) may be ascribed to various projects. The teachings disclosed herein are applicable to nearly any sorting characteristic as may be deemed helpful in managing a domain name portfolio, some of which are discussed below. Similarly, the term "project" does not necessarily mean the projects are task oriented. For example, the projects 302, 304 may be based on characterizations or attributes of domain names within the project rather than attributable to a particular goal. Further, the teachings described herein may apply to other domain names, subdomains, directories, etc., not presently owned by the user, but which may be in a "wish list" or "watch list" for the user account, are on backorder by the user, and/or are presently being actively pursued by the user (pre-registrations, auctions in progress, pending and previous offers, etc.), and by other associations.

In this example, as discussed above, the first project 302 includes a sorting characteristic for domain names that are similar to a primary domain name 306 of "example.com". The primary domain name 306 is shown at the top of the first project 302, and the first project 302 may bear the same title, though other titles may be used (e.g., determined by the server 100 or entered by the user 112). Other secondary domain names 308 are shown below the primary domain name 306. In this example, the secondary domain names 308 are domain names that resemble the primary domain name 306 (e.g., have a different TLD or are misspellings or are similar to the primary domain name 306). Similarly, the second project 304 in this example includes a sorting characteristic for domain names that are similar to a primary domain name 310 of "example.co.uk" and are within the ".uk" TLD. In this example, according to one embodiment, the secondary domain names 308, 312 may be configured to redirect to the respective primary domain name 306, 310.

The primary domain names 306 and 310 may or may not be part of the plurality of domain names 300 that are associated with the user account. For example, if the user account is for a domain speculator or broker, the broker may not own the primary domain names "example.com" or "example.co.uk" but may have created and/or named these projects 302, 304 to sort a plurality of secondary domain names 308, 312 that are associated with the broker's user account (e.g., domain names that the broker owns) that correspond to those primary domain names 306, 310. In such an instance, the actual primary domain name 306, 310 may not have been sorted itself (as it is not purely associated with the user account), but has been determined by the server 100 or the user 112 to be one proper basis for sorting. Further, in some embodiments, some of the plurality of domain names 300 may not be owned by the broker, but may be in a "wish list" or "watch list" for the broker's user account, are on backorder by the broker, are presently being actively pursued by the broker (pre-registrations, auctions in progress, pending and previous offers, etc.), and are associated with the user account in this manner. They may be presented to the user in the GUI in a different manner (e.g., grayed out, different color, etc.). By this, the broker may amass and organize a collection of secondary domain names 308 or 312 that they may later sell or license to the owner of the primary domain name 306, 310 or to some other entity. Many other sorting characteristics are possible for the projects 302 and 304 in this scenario, some of which are discussed below, and the teachings disclosed herein are applicable to nearly all variations of sorting characteristics.

Returning to FIG. 2, the method 200 includes at step 204, storing the sorted plurality of domain names 300 as part of the user account. In FIG. 3, plurality of domain names 300 are stored 314 into a data store 316 to be saved and recalled later. As is understood in the art, many different methods of formatting the data to store 314 the sorted plurality of domain names 300 are possible and are contemplated by this disclosure. The data store 316 may be the data store 114 in FIG. 1, or another data store (e.g., a data store in the second server 108, or another remote or local server).

At step 206, in one embodiment, the method 200 includes presenting on a display device 110 the sorted plurality of domain names 300 in a hierarchy within at least one of the plurality of projects (e.g., projects 302, 304) via a graphical user interface (GUI). The actual format, appearance, and/or function of the GUI may be very diverse from one application setting to another. One example of this is shown in FIG. 3 with a primary domain name 306, 310 on top and secondary domain names 308, 312 shown graphically under the respective primary domain name 306, 310 in a hierarchal manner. The user 112 may be able to hide or show the secondary domain names 308, 312. By this, a user 112 can quickly see the hierarchy of the project to determine the project's purpose, sorting characteristic, progress, volume, value, diversity, or another metric.

Figure 4:
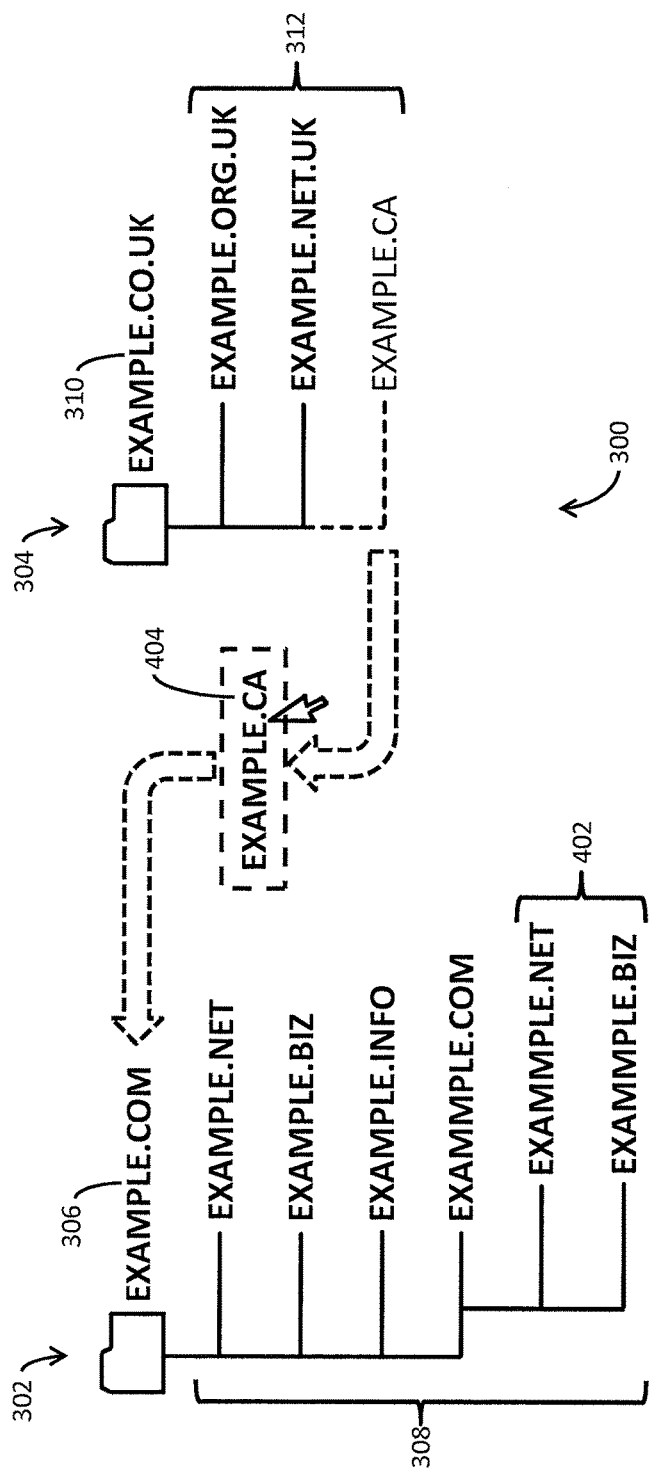

Turning now to FIG. 4, another representative portion of an example GUI is shown in accordance with another embodiment. Here, the first project 302 and second project 304 are shown within a familiar folder structure. The primary domain names 306, 310 are shown as the top or root folders, while the secondary domain names 308, 312 are shown as the sub-folders or sub-files within the root folder. The secondary domain names 308, 312 can be shown or hidden by expanding the top or root folder. In certain embodiments, the secondary domain names 308, 312 may include various nested levels of secondary domain names. For example, the first project 302 may include additional secondary domain names 402 as part of the sorted secondary domain names 308. These additional secondary domain names 402 may be further sorted under a higher secondary domain name. Here, the misspelled domain name "exammple.com" is a secondary domain name to the properly spelled primary domain name "example.com", while additional secondary domain names 402 of "exammple.net" and "exammple.biz" are similar to the misspelled domain name "exammple.com" and may be sorted thereunder as secondary domain names thereto. Other misspellings may include omissions of period delineators (e.g., "wwwexample.com" or "examplecom.com") or plural or singular versions (e.g., "examples.com"). Again, many possible different GUIs and GUI formats are possible to display on a display device 110 of a client device 106 beyond those illustrated in FIGS. 3 and 4 to depict the sorted plurality of domain names 300 in a hierarchical manner. For example, domain names could be graphically presented as screenshots corresponding to content at the address of the domain name or of other images associated with the particular domain name instead of or in addition to the domain name.

Continuing with FIG. 2, in one embodiment, the method 200 may at step 208 include the server 100 of the domain name management service recommending at least one new domain name not currently associated with the user account based at least in part on a sorting characteristic of one or more projects. Continuing with the previous examples, a domain name of "eexample.com" or "example.org" may be recommended to the user 112 for inclusion in the first project 302 as they are misspellings of the primary domain name 306 "example.com". The user 112 may then purchase the suggested domain names if they are available or add the suggested domain names to one or more projects under a wish or watch list. Recommended domain names may be based on any sorting characteristic or based on any project.

At step 210, in one embodiment the method 200 includes enabling a user 112 of the user account to perform at least one manual sorting action of a domain name into a project. As is shown at step 212, in one approach, the manual sorting may include enabling a user 112 of the user account to drag and drop via a GUI the at least one domain name into a graphical representation of one of the projects. In another embodiment still, the method 200 may include the user 112 performing these steps 210, 212. FIG. 4 shows a domain name 404 of "example.ca" being manually sorted by the user 112 manually dragging and dropping the domain name 404 from the second project 304 into the first project 302. Many other methods of graphical domain name manipulation and sorting are possible. For example, on a touch-screen enabled device, a user 112 can touch, pinch, spread, swipe, throw, fling, flick, scroll, drag, multi-finger gestures (e.g., rotate, zoom, scroll, etc.), or perform another gesture on a graphical representation of a domain name. In another embodiment, the domain name 404 may not have been previously sorted into a project and may be a newly purchase domain name or a domain name newly added to a wish or watch list that is subsequently sorted by the user 112. In certain embodiments, the processing device 102 or another processing device or server may consider manual sorting actions by the user 112 or all users to learn preferences and/or update potential sorting characteristics or sorting algorithms. For example, it may be determined that the TLD ".me" is used more for personal use rather than to geographically represent the country of Montenegro, or that ".buzz" is being predominantly used in a cannabis-related setting rather than a news setting.

Figure 5:
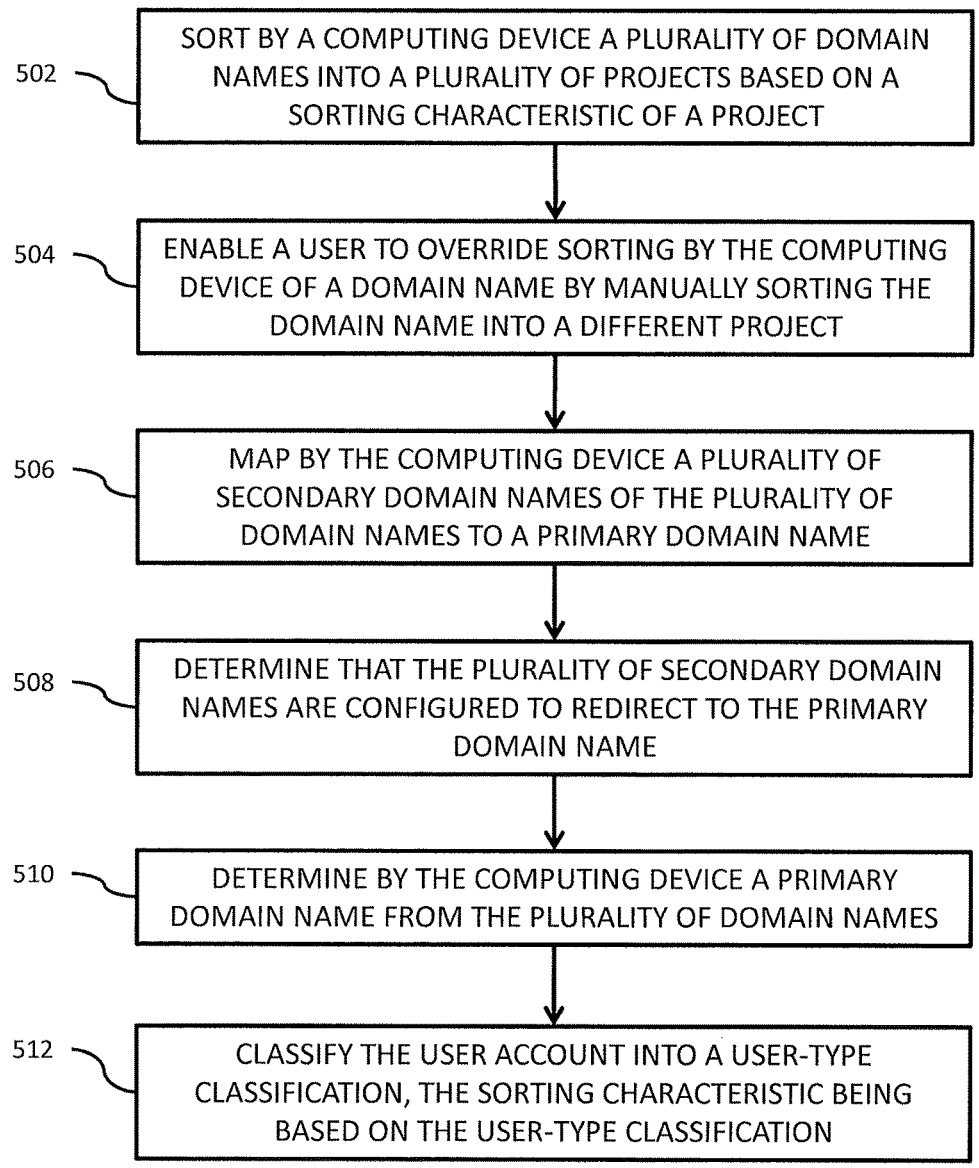
FIG. 5 is a functional schematic diagram of an alternative method in accordance with various embodiments of the present disclosure.

FIG. 5 illustrates alternative or additional method steps 500 that may be performed in addition to or in place of various steps of the method 200 in accordance with various embodiments. A computing device such as the server 100 or the client device 106 may be configured to execute one or more of the steps illustrated in FIG. 5 or described in other methods elsewhere herein. In one embodiment, as show at step 502, a computing device, such as the server 100, may perform the sorting of the plurality of domain names into the plurality of projects to create the sorted plurality of domain names 300 based on a sorting characteristic of one or more of the projects. The sorting by the computing device may occur automatically without or independent of any action of the user 112 or with minimal input on the part of the user 112 (e.g., the user 112 issuing a command to begin sorting the plurality of domain names, or the user 112 designating a sorting characteristic or a primary domain name for one of the projects).

In some embodiments, an unsorted plurality of domain names may become a sorted plurality of domain names 300 completely by the computing device. In another embodiment, a plurality of domain names sorted in one manner may become the sorted plurality of domain names 300 sorted in another manner completely by the computing device. This may include the computing device (e.g., server 100) selecting or determining one or more sorting characteristics of one or more of the projects, selecting a primary domain name, and/or sorting the plurality of domain names according to the sorting characteristics.

In certain embodiments, at step 504, the computing device (e.g., server 100) may enable a user 112 of the user account to override a sorting of at least one domain name by the computing device by enabling the user to manually sort the domain name into a different project. This is illustrated in FIG. 4 where the domain name 404 "example.ca" is being manually sorted from the second project 304, which the computing device originally sorted it into, to the first project 302. Many other methods of executing such a manual override are possible (e.g., typing in the project into which to place the domain name, clicking a check box, etc.), all of which are contemplated by this disclosure.

One method of sorting the plurality of domain names by the computing device (e.g., server 100) may include, as is included at step 506, the computing device mapping a plurality of secondary domain names (e.g., 308 and 312) to at least one primary domain name (e.g., 306 and 310). Mapping may include the computing device determining one or more "connections" between the secondary domain name and the primary domain name. These connections may be logical connections (e.g., the secondary domain name is configured to redirect to the primary domain name, all the domain names have the same TLD, etc.) or other subjective connections (misspellings and the like).

In certain embodiments, as is shown at step 508, mapping further entails the computing device determining that all or some the plurality of secondary domain names are configured to redirect to the primary domain name. This can be determined through a series of WHOIS lookups or through reviewing other locally stored data pertaining to the plurality of domain names, these lookups or data informing the computing device of the redirect configurations.

In other embodiments, as is shown at step 510, the computing device may determine the primary domain names from the plurality of domain names. In the previous examples used herein and illustrated in FIGS. 3 and 4, if the misspelled secondary domain name "exammple.com" redirects to the correctly spelled primary domain name "example.com," then the computing device may determine that "example.com" is the primary domain name and the redirected domain name is a secondary domain name thereto. In other approaches, a primary domain name may not be associated directly with the user account, but may still be selected as such. For example, if the user account manages a portfolio of misspellings of "example.com", but the domain "example.com" itself is managed by a different user account or by a different entity entirely.

In still other embodiments, the computing device or server 100 may create or configure redirects for various domain names of the plurality of domain names associated with a user account. For example, the computing device may automatically configure all or some of the secondary domain names 308 to redirect to the primary domain name 306, thereby removing from the user 112 the burden of configuring the redirects.

The above described methods are but a few methods of determining mappings and primary domain names and of sorting a plurality of domain names. Many other sorting characteristics may be determined and various other connections between domain names may be determined based on a plethora of data. That data may be related directly to the domain names themselves, to the user 112 or the user account, or may be based on other data indirectly related to the domain names. In various embodiments, the computing device (e.g., server 100) may perform or effect performance of data analytics or logical clustering analysis (e.g., "big data" analysis) on a plurality of domain names to sort domain names into projects, to determine a primary domain name (if applicable), to determine sorting characteristics of projects. These processes may search for patterns or similarities within groups of domain names in the plurality of domain names to create the projects.

Various data sets and data types may be used in determining projects, groupings, sorting characteristics of the projects, and in the sorting process itself. In one approach, email addresses attached to a domain name may be utilized. In a non-limiting example, if a plurality of domain names all have the same email address or email address domain, they may be grouped into a project. Further, the domain of the email address may indicate the primary domain name for the project. In another approach, the computing device may utilize information as to whether a hosting site is attached to a domain name, whether content is located at the address of the domain name, or whether an online store is attached to the domain name. In a non-limiting example, if a domain name does not include an associated hosting site or an address of a hosting service, does not link to actual web content, or does not include an online store, the computing device may infer that the domain name is not a primary domain and is therefore a secondary domain, whereas the presence of these aspects may infer the opposite. Additionally, the computing device may examine the amount of income or money generated by an online store to determine which domain names are primary domain names.

In another approach, the computing device may utilize a number of hits (e.g., direct URL entries and search engine hits) generated by various domain names to sort the domain names. In a non-limiting example, if one domain name generates thousands or millions times more hits than another, it may be inferred that the high-traffic domain name is the primary domain name while the other is a secondary domain name. In other embodiments, high volumes of email traffic associated with a domain name may be similarly indicative. In other embodiments still, a user, DNS information, and/or other external sources may provide information that is similarly indicative.

In another embodiment, data relating to geographical or language-based aspects of domain names and domain name searches or DNS requests may be used by the computing device during sorting. In a non-limiting example, a plurality of domain names may be sorted geographically to service various parts of the world. For example, one version of a website "example.com" may be primarily for the United States, while another version of the website may be for Mexico (e.g., "example.mx" or "mexico.example.com") or India (e.g., "example.in" or "india.example.com"). In another example, a version of the website may be for French or Spanish speaking users (e.g., "francais.example.com" or "espanol.example.com"). Domain names may be sorted according to these aspects. Additionally, other geographical or language-based information may be utilized in sorting domain names, including but not limited to originating locations of Domain Name System (DNS) requests for the domain name, incoming language of domain name requests, languages used by requesting client devices for the domain name, location of request client devices for the domain name, and so forth. Still other geographical information may include, for example, utilization by a user 112 of a user account of a maps program or application including geographic aspects or geographical search history that may provide information regarding a geographical or lingual nature of a domain name or project, or other aspects in general pertaining to the domain name or project.

In another embodiment, data relating to search engine handling of the domain name or terms within a domain name string may be utilized by the processing device during sorting of the domain names as sorting characteristics. Some examples include the number of search engine queries for a domain name, search engine autocomplete suggestions associated with the domain name, search engine search request correction suggestions associated with the domain name, information from a Search Engine Optimization (SEO) pertaining to a domain name or a project, and/or information from a Search Engine Marketing (SEM) scheme pertaining to domain name or a project (e.g., via GOOGLE ADWORDS, BING ADS, and BAIDU). For example, if a particular domain name string is used in many search engine queries or a particular website having that domain name is often selected in response to a particular search engine query, then it may be inferred that the particular domain name is a primary domain name or is the focus of a particular project. In another example, information as to whether or how often a search engine autocompletes a search request entry to a particular domain name string may be used. Similarly, information as to whether or how often a search engine will suggest a corrected domain name string in response to a misspelled search engine query may be used. Similarly still, how often users of the search engine select the autocompleted or corrected versions of domain name strings may indicate a primary domain, a project, or that secondary domain names (e.g., the misspelled versions) can be associated with the subsequently selected primary domain names. In a similar fashion, autocorrect functions, algorithms, and results may be useful in determining a primary domain name and/or secondary domain names (e.g., in determining which is a common misspelling of the other).

In another non-limiting example, SEO data or SEM data attached to or pertaining to a domain name or a project may be useful in sorting the domain names. For example, the attachment of SEO or SEM data to a domain name may be indicative that the domain name is a primary domain name or that other secondary domain names referenced by or targeted by the SEO or SEM may be secondary to the primary domain name. This SEO and SEM data may be utilized to sort domain names in a multitude of other methods not explicitly described herein, but which are contemplated by the present disclosure.

Is still another embodiment, data relating to the user account or a user 112 of the user account may be utilized by the computing device to sort the plurality of domain names. For example, a domain name search history record associated with the user account or a domain name aftermarket auction history associated with the user account may be helpful in determining what domain names the user 112 is interested in procuring or investigating. This information may provide additional insight as to which domain name may be a primary domain name or the focus of a project, which domain names are secondary domain names, and a proper sorting of the plurality of domain names. For example, the fact that a user 112 often searches for domain names that are similar in spelling to a particular domain name may indicate that the particular domain name is the pertinent primary domain name.

Additionally, user account interaction history may be used by the processing device to sort the plurality of domain names. A history of user 112 interactions with the user account may include the frequency which the user 112 logs on, performs searches, or purchases, sells, or edits domain names. Other user account interaction information may include email traffic associated with the user account (e.g., domain names of email addresses for messages sent to or from an email account associated with the user account). Further, email content associated with the user account or content of email messages associated with the user account can be utilized in sorting the plurality of domain names.

Other examples of user account interaction information may include user utilization of or investigation into other features that may be offered as part of the user account. For example, if a user 112 utilizes or investigates a website builder tool in association with a particular domain name, activates or investigates data hosting associated with a particular domain name, or purchases or sets up an email address associated with a particular domain name, it may be indicative that the domain name is a primary domain name.

Further still, user account interaction information may include interaction information not directly pertinent to the plurality of domain names. For example, user interaction with other features or offerings of the user account or other linked applications or web services not directly related to the domain name portfolio (e.g., in general: web search, email, maps, documents, photos, cloud storage, music, calendars, online meetings, collaborations, and so forth). These interactions provide a wealth of information that can be used in various ways to help sort the plurality of domain names, determine projects, and determine primary and/or secondary domain names, all of which are contemplated by this disclosure. Moreover, other locally stored data (e.g., data stored on the client device 106 such as cookies, favorites, browser history, and the like) may be similarly used.

In general, the various data used to sort the plurality of domain names may be processed by the processing device (e.g., server 100) or processed by a different server 108 to perform data analytics and/or clustering analysis as is understood in the art. The results of the data analytics or clustering analysis may yield any number of differing resultant sorted plurality of domain names 300 having different domain name classifications or groupings. For example, if multiple different sorting schemes are determined, some or all of the multiple sorting schemes may be provided to a user 112 to select the most appropriate or useful sorting scheme. The domain name management service may have a default sorting scheme which can in turn be modified by the user 112.

In one approach, as is shown at step 512 of FIG. 5, the computing device may classify the user account into a user-type classification. A sorting characteristic of one or more of the projects may then be based upon the user-type classification. Such user-type classifications may include but are not limited to a primary user-type (which may include an individual or entity such as a company that uses one or more of the domain names in a commercial or non-commercial way to output web content at the location corresponding to the domain name) and a domain name broker user-type (which may include a domain speculator or broker whose primary goal in owning a domain name is to subsequently sell it or license it for a profit). Many other user-types may exist and are contemplated by this disclosure. These different user-types may benefit from differing methods of sorting a plurality of domain names. For example, a primary user-type may benefit most by having the domain names sorted into projects based on their similarity to a primary domain (e.g., "example.com"), possibly into different projects based on the number of improper letters in a misspelling of the primary domain name, or sorted geographically based on region or country. However, a broker user-type may benefit most by having the domain names sorted into projects based on their estimated value, number of letters, or other factors. Therefore, the user-type classification can be useful for the processing device to understand when determining how to sort the plurality of domain names and/or how to select sorting characteristics of the projects and/or the projects themselves.

To determine the user-type classification, the computing device may look at the settings of the user account (e.g., to determine if a user-type has been selected or indicated by a user 112 of the user account) or other factors. In certain examples, this classification may be made through the use of data analytics to determine whether the user's actions are in line with a primary user (e.g., most of the domain names in the user account focused on a particular theme or are similar in nature, or the user has actual content attached to one or more of the domain names) or in line with a broker (e.g., most of the domain names are fairly diverse and without substantive content attached to any particular domain name). Similarly, if a user 112 investigates a website builder tool, data hosting options, or other features associated with the user account, it may be indicative that the user account is a primary user. Data analytics, as are understood in the art, may be performed by the server 100 or by a different server such as the second server 108.

By implementing the disclosed domain name sorting methods, users 112 are able to easily keep track of a plurality of domain names grouped by projects. Further, in some embodiments, sorting can occur automatically thereby reducing or eliminating the amount of time a user 112 is required to spend to organize a portfolio of domain names.

Figure 6:
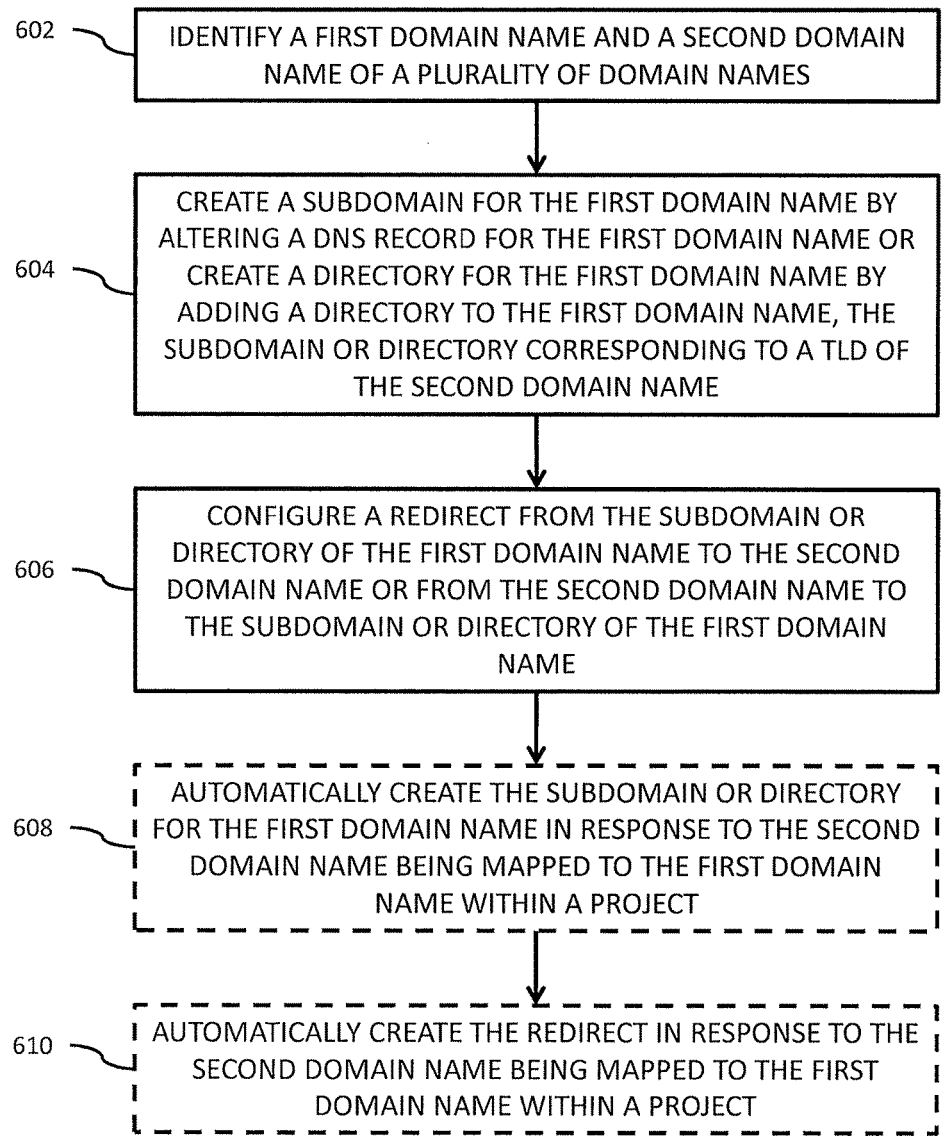
FIG. 6 is a functional schematic diagram of another alternative method in accordance with various embodiments of the present disclosure.

Turning now to FIG. 6, an additional method 600 is illustrated in accordance with various embodiments. This method 600 may, in one embodiment, be performed by a server device 100 configured to perform the method 600. The method includes at step 602 identifying a first domain name and a second domain name of a plurality of domain names. In one example, the plurality of domain names may be associated with a user account. For example, a first domain name may be a primary domain name 306, 310 of a project 302, 304 and the second domain name may be a secondary domain name 308, 312 of the project 302, 304. In such an instance, identifying the first and second domain names may include identifying that the first and second domain names have been sorted into a project 302, 304. Step 602 may be initiated manually by a user supplying both the first and second domain names. In that case, the user may be the registrant for each of the first and second domain names in which case the first and second domain names are associated with a user account belonging to the user. In other cases, however, step 602 may be initiated by the server device 100 automatically and without any input being supplied by the user. For example, the server device 100 may be configured to monitor the domain name registrations of the user. For example, the server device 100 may monitor the user's user account or other records that maintain a listing of current domain names that are registered to the user. When the user registers a new domain name, the server device 100 may perform step 602 without any input from the user. For example, upon detecting a new domain name registration, in step 602 the server device 100 may designate the new domain name as either the first or second domain name and then identify another domain name that has been registered by the user as the other of the first and second domain name. Then, as described below, server device 100 may go on to perform the remaining steps of th method 600 without further input from the user.

The method 600 also includes at step 604 creating a subdomain or directory for the first domain name. The subdomain or directory corresponds to a TLD of a second domain name, wherein the first and second domain names are part of the plurality of domain names associated with the user account. This plurality of domain names may include the sorted plurality of domain names 300 described above, or may include an unsorted group of domain names. In one approach, the subdomain name can be created for the first domain name by the server device 100 altering a Domain Name Service (DNS) record for the first domain name. For example, a subdomain can be added to the DNS record for the first domain name. In a different embodiment, a directory can be created for the first domain name by the server device 100 adding a directory to the first domain name. In certain embodiment, the creation of the subdomain or directory may occur automatically by the server 100. In such an automatic fashion, the server 100 may create the subdomains or directories without being specifically instructed to create each individual subdomain or directory by a user 112 (though a user 112 may generally instruct the server 100 to create the subdomains or directories, e.g., by enabling such a feature). Alternatively, "automatic" may imply that the server 100 can perform the necessary steps to create the subdomains and/or directories instead of requiring the user 112 to manually perform the steps. In such an approach, for example, a user 112 may be queried as to whether the user 112 wishes for the subdomain or directory to be created, but would not need to actually perform the task. By this, a user 112 is relieved of the burden of creating individual subdomains and/or directories. Similarly, a user 112 may be relieved of needing to determine which subdomains and/or directories should be or need to be created.

For example, a user account includes a first domain name "example.com" and a second domain name "example.blog" (i.e., with a TLD of .blog). The server 100 may then create a subdomain for the first domain name that includes or is otherwise related to the TLD of the second domain name. Thus, the server 100 may create "blog.example.com". This may be done, for example, by creating a DNS record for the "example.com" domain that includes a CNAME record establishing an alias for the domain "blog.example.com" to the domain "example.com." In another approach, the server 100 may create a directory for the first domain name that includes or is otherwise related to the TLD of the second domain name. Thus, the server 100 may create "example.com/blog". Similarly, in an opposite manner, the server 100 may create subdomains or directories for the second domain name that correspond to the TLD of the first domain name. Creation of the subdomains and directories may be formed for any number of different domain names associated with a user account, which subdomains and directories may also correspond to the TLD of any number of other domain names associated with the user account. In some embodiments, the server 100 may be configured to only create the subdomains and/or directives for TLDs that qualify as gTLDs. In such an embodiment, the server will not create the subdomain and/or directories for TLDs that qualify as country code TLDs (ccTLDs), internationalized ccTLDs, or generic TLDs (e.g., .net, .com, .org, etc.)

At step 604, the method 600 may include configuring a redirect from the subdomain or directory of the first domain name to the second domain name. Alternatively or additionally, and in a reverse manner, a redirect from the second domain name to the subdomain or directory of the first domain name can be created. The redirects may be HTTP 301 redirects, HTTP 302 redirects, Meta Refresh redirects, DNS redirects, or any other redirect technique as is understood in the art. DNS redirects may include altering an A-RECORD, a CNAME, or an ALIAS for the domain name or the subdomain or directory to redirect to the desired end location. In a similar fashion to the creation of the subdomain or directory, configuring a redirect may be performed automatically by the server 100. Thus, a user 112 is relieved of the burden of configuring the redirect or of even determining which redirects are required to be configured.

By way of continuing example, per step 604, the created subdomain "blog.example.com" or directory "example.com/blog" (of the first domain name) may be configured to redirect to the second domain name "example.blog". Alternatively, the second domain name "example.blog" may be configured to redirect to the created subdomain "blog.example.com" or directory "example.com/blog" (of the first domain name). A user of the user account may determine which approach (or both) is most useful, for example, dependent upon which domain name they wish to be utilized the most. By this, a user or entity associated with the user account can capture additional internet traffic that may be otherwise lost due to mistyped or wrongly entered URLs or Internet addresses. For example, if an Internet end user was attempting to access "example.blog" but mistakenly typed in "blog.example.com" or "example.com/blog", the Internet end user would automatically be redirected to the proper webpage. Similarly, if an Internet end user was attempting to access "blog.example.com" or "example.com/blog" but mistakenly entered "example.blog", the Internet end user would automatically be redirected to the proper webpage.

In some embodiments, the creation of the subdomains and/or directories or the configuration of the redirects may be performed with respect to one or more projects 302, 304 associated with the user account. For example, the first domain name may be a primary domain name 306, 310, while the second domain name may be one of the secondary domain names 308, 312. In such an approach, and as is shown in step 608, the server 100 may automatically create a subdomain and/or directory for the primary domain name 306, 310 (e.g., the first domain name) corresponding to TLDs of all or some of the secondary domain names 308, 312 mapped to primary domain name 306, 310 within the project 302, 304. The creation of the subdomain and/or directory may be responsive to the computing device identifying the second domain name, for example, by identifying that the second domain name has been mapped to a primary domain name 306, 310 (e.g., first domain name) within the project 302, 304. Further still, as is shown in step 610, the server 100 may automatically configure redirects between the created subdomains and/or directories of the primary domain name 306, 310 to or from all or some of the secondary domain names 308, 312 within the project 302, 304. Configuring the redirects may be responsive to the computing device identifying the second domain name, for example, by identifying that the second domain name has been mapped to a primary domain name 306, 310 (e.g., first domain name) within the project 302, 304. Accordingly, in some embodiments, upon creation or editing of a project 302, 304, or any time thereafter, connections between the TLDs of secondary domain names 308, 312 and the created subdomains and/or directories of the primary domain name 306, 310 can be established simply by being within a same project 302, 304.

Figure 7:
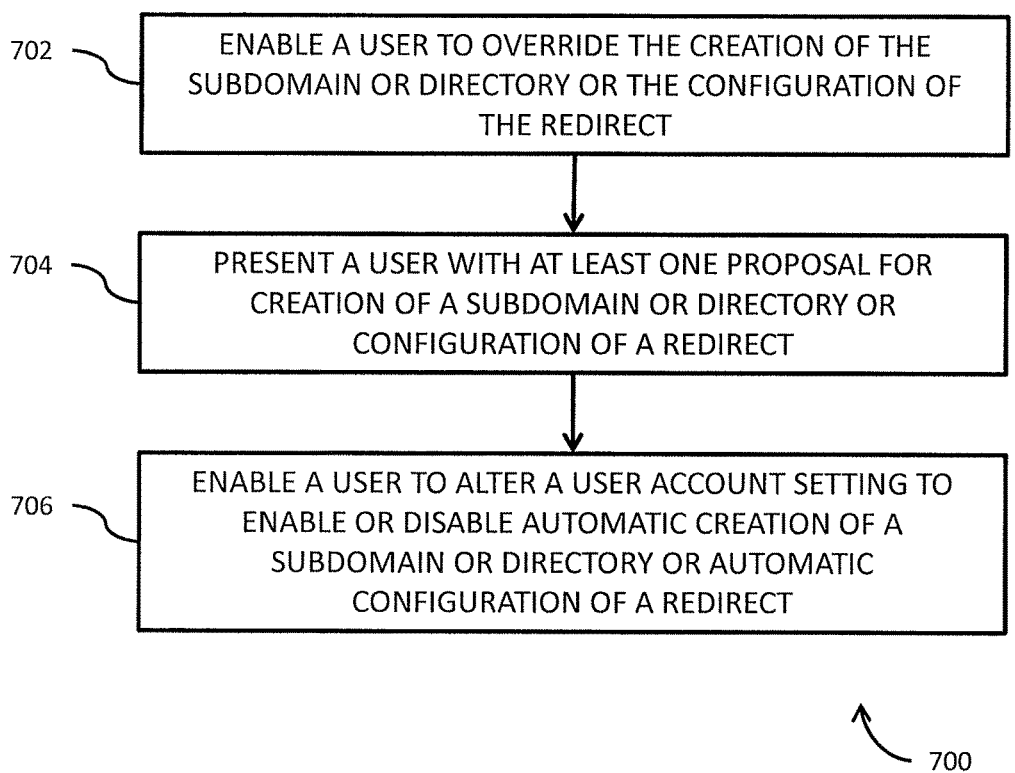
FIG. 7 is a functional schematic diagram of yet another alternative method in accordance with various embodiments of the present disclosure.

Although many of these steps are described as automatic, a user 112 may retain control of these actions in some approaches. Turning now to FIG. 7, a method 700 including alternate method steps is illustrated in accordance with various embodiments. In one embodiment, as is shown at step 702, the method 700 includes enabling a user 112 of the user account to override or undo the automatic configuration of a redirect, or to override or undo the automatic creation of a subdomain and/or directory. Similarly, in another embodiment as is shown at step 704, the method 700 may include presenting to a user 112 of the user account a proposal for creation of a subdomain and/or directory and/or a proposal for configuration of a redirect. This proposal may be based on any number of factors. In one approach, the proposal may be based on the fact that the pertinent domain names are within a same project 302, 304. Accordingly, the creation of the subdomain and/or directory (step 604) and/or the configuration of a redirect (step 606) may be performed after receiving a positive response from the user 112 with respect to the proposal. In still other embodiments, a user 112 may retain control over the creation of the subdomains and/or directories or configuration of the redirects through various user settings. For example, and as illustrated at step 706, a user 112 of the user account may be enabled to alter a user account setting that enables or disables automatic creation by the server 100 of the subdomain or directory for the first domain name, or the automatic configuring of a redirect. Accordingly, in such an approach, the automatic creation of the subdomain and/or directory (step 604) and/or the automatic configuration of a redirect (step 606) may be performed when the pertinent user account setting enables such performance.

All or some of the created subdomains and directories may be show on a display via a GUI in a similar fashion as is discussed above. Additionally, the various redirects may be graphically illustrated as well (for example, via lines or arrows between subdomains or directories of first domain names and second domain names) to enable a user 112 to quickly graphically see and comprehend a network of redirects, subdomains, and directories, which network can in some application settings be very large.

Through implementation of the above described methods, a user is relieved of the burden of manually creating subdomains and/or directories for a first domain name. Similarly, the user is relieved of the burden of manually configuring redirects between the second domain name and the subdomain and/or directory of the first domain name. Further still, a user or entity is more easily able to capture traffic from incorrectly entered URIs or Internet addresses, thereby increasing their web presence.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Various embodiments of the invention may be implemented at least in part in any conventional computer programming language. For example, some embodiments may be implemented in a procedural programming language (e.g., "C", and the like), or in an object oriented programming language (e.g., "C++" "JAVA", and the like). Other embodiments of the invention may be implemented as preprogrammed hardware elements (e.g., application specific integrated circuits, FPGAs, and digital signal processors), or other related components.

In some embodiments, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium.

The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention has been described in terms of one or more preferred embodiments, and it should be appreciated that many equivalents, alternatives, variations, and modifications, aside from those expressly stated, are possible and within the scope of the invention.

I claim:

1. A method comprising:
   detecting, by a computing device, a registration of a first domain name by a user associated with a user account;
   automatically accessing, by the computing device and without input from the user, a Domain Name System (DNS) server to identify a second domain name selected from a plurality of domain names associated with the user account, the identified second domain name at least partially matches the registered first domain name;
   automatically creating, by the computing device and without input from the user, a directory at the second domain name, a name of the created directory comprising a top-level domain (TLD) of the first domain name; and
   automatically configuring, by the computing device and without input from the user, a redirect from the created directory of the second domain name to the first domain name or from the first domain name to the created directory of the second domain name.

2. The method of claim 1, wherein the configuring the redirect further comprises configuring at least one of a Hypertext Transfer Protocol (HTTP) 301 redirect, an HTTP 302 redirect, a Meta Refresh redirect, and a DNS redirect.

3. The method of claim 1, wherein the plurality of domain names associated with the user account is sorted into at least one project associated with the user account, and wherein the second domain name comprises a primary domain name of the at least one project and wherein the first domain name comprises a secondary domain name mapped to the primary domain name within the at least one project.

4. The method of claim 3, further comprising:
   creating automatically, by the computing device, the directory for the second domain name in response to the computing device identifying the first domain name, wherein the identifying the first domain name further comprises identifying that the first domain name has been mapped to the second domain name within the at least one project.

5. The method of claim 1, further comprising enabling the user of the user account to override the redirect.

6. The method of claim 1, further comprising:
   presenting to the user of the user account with at least one proposal for the redirect prior to the configuring the redirect; and
   configuring automatically the redirect in response to receipt of a positive response from the user with respect to the at least one proposal.

7. The method of claim 1, further comprising:
   enabling the user of the user account to alter a user account setting to enable or disable automatically creating, by the computing device, the directory; and
   creating automatically, by the computing device, the directory when the user account setting enables the automatically creating the directory.

8. The method of claim 1, further comprising:
   enabling the user of the user account to alter a user account setting to enable or disable automatically configuring by the computing device the redirect; and
   configuring automatically, by the computing device, the redirect when the user account setting enables the automatically configuring the redirect.

9. A system, comprising:
   a computing device, implemented at least partially by hardware, in communication with a Domain Name System (DNS) and being configured to perform the following steps of:
   detecting, by the computing device, a registration of a first domain name by a user associated with a user account;
   automatically accessing, by the computing device and without input from the user, the DNS server to identify a second domain name selected from a plurality of domain names associated with the user account, the identified second domain name at least partially matches the registered first domain name;
   automatically creating, by the computing device and without input from the user, a directory at the second domain name, a name of the created directory comprising a top-level domain (TLD) of the first domain name; and
   automatically configuring, by the computing device and without input from the user, a redirect from the created directory of the second domain name to the first domain name or from the first domain name to the created directory of the second domain name.

10. The system of claim 9, wherein the computing device is configured to:
    configure automatically at least one of a Hypertext Transfer Protocol (HTTP) 301 redirect, an HTTP 302 redirect, a Meta Refresh redirect, and a DNS redirect from the directory of the second domain name to the first domain name.

11. The system of claim 9, wherein the computing device is configured to:
    sort the plurality of domain names into at least one project associated with the user account, wherein the second domain name comprises a primary domain name of the at least one project and wherein the first domain name comprises a secondary domain name mapped to the primary domain name within the at least one project.

12. The system of claim 11, wherein the computing device is configured to:
  identify the first domain name by identifying that the first domain name has been mapped to the second domain name within the at least one project; and
  create automatically the directory for the second domain name in response to the computing device identifying the first domain name.

13. The system of claim 9, wherein the computing device is configured to:
  enable the user of the user account to override the redirect.

14. The system of claim 9, wherein the computing device is configured to:
  present to the user of the user account with at least one proposal for the redirect prior to configuring the redirect; and
  configure automatically the redirect in response to receipt of a positive response from the user with respect to the at least one proposal.

15. The system of claim 9, wherein the computing device is configured to:
  enable the user of the user account to alter a user account setting to enable or disable automatically creating by the computing device the directory; and
  create automatically the directory when the user account setting enables creating the directory.

16. The system of claim 9, wherein the computing device is configured to:
  enable the user of the user account to alter a user account setting to enable or disable automatically configuring by the computing device the redirect; and
  configure automatically the redirect when the user account setting enables configuring the redirect.

17. A server device, implemented at least partially by hardware, configured to:
  detect a registration of a first domain name by a user associated with a user account;
  automatically access, without input from the user, a Domain Name System (DNS) server to identify a second domain name selected from a plurality of domain names associated with the user account, the identified second domain name at least partially matches the registered first domain name;
  automatically create, without input from the user, a directory at the second domain name, a name of the created directory comprising a top-level domain (TLD) of the first domain name; and
  automatically configure, without input from the user, a redirect from the created directory of the second domain name to the first domain name or from the first domain name to the created directory of the second domain name.

18. The server device of claim 17, further configured to:
  sort the plurality of domain names into at least one project associated with the user account, wherein the first domain name comprises a primary domain name of the at least one project and wherein the second domain name comprises a secondary domain name mapped to the primary domain name within the at least one project.

19. The server device of claim 18, further configured to:
  create automatically the directory for the first domain name in response to the second domain name being mapped to the first domain name within the at least one project; and
  configure automatically the redirect in response to the second domain name being mapped to the first domain name within the at least one project.

20. The server device of claim 17, further configured to:
  enable the user of the user account to alter at least one user account setting to enable or disable at least one of automatically creating by the server device the directory and automatically configuring by the server device the redirect; and
  at least one of create automatically the directory and configure automatically the redirect according to the at least one user account setting.

* * * * *